US010562264B2

(12) United States Patent
Nakamura et al.

(10) Patent No.: US 10,562,264 B2
(45) Date of Patent: Feb. 18, 2020

(54) WATERPROOF MOISTURE-PERMEABLE FABRIC AND INFECTION PROTECTIVE GARMENT

(71) Applicant: TORAY INDUSTRIES, INC., Tokyo (JP)

(72) Inventors: Taketoshi Nakamura, Otsu (JP); Yuichiro Hayashi, Otsu (JP); Masanobu Takeda, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 131 days.

(21) Appl. No.: 15/567,811

(22) PCT Filed: Apr. 27, 2016

(86) PCT No.: PCT/JP2016/063238
§ 371 (c)(1),
(2) Date: Oct. 19, 2017

(87) PCT Pub. No.: WO2016/175250
PCT Pub. Date: Nov. 3, 2016

(65) Prior Publication Data
US 2018/0099476 A1    Apr. 12, 2018

(30) Foreign Application Priority Data

Apr. 28, 2015    (JP) ................................. 2015-091197

(51) Int. Cl.
| | | |
|---|---|---|
| *B32B 5/24* | (2006.01) | |
| *A41D 31/02* | (2019.01) | |
| *A41D 13/00* | (2006.01) | |
| *A41D 31/00* | (2019.01) | |
| *A41D 31/102* | (2019.01) | |
| *B32B 7/14* | (2006.01) | |
| *B32B 27/40* | (2006.01) | |
| *B32B 27/32* | (2006.01) | |

(52) U.S. Cl.
CPC ................ *B32B 5/24* (2013.01); *A41D 13/00* (2013.01); *A41D 31/00* (2013.01); *A41D 31/02* (2013.01); *A41D 31/102* (2019.02); *B32B 7/14* (2013.01); *B32B 27/40* (2013.01); *B32B 27/322* (2013.01); *B32B 2266/0278* (2013.01); *B32B 2307/7265* (2013.01); *B32B 2437/00* (2013.01)

(58) Field of Classification Search
USPC ............. 604/385.01; 524/513, 318; 156/334; 428/500, 35.7
See application file for complete search history.

(56) References Cited

U.S. PATENT DOCUMENTS

2012/0116341 A1    5/2012 Corzani et al.

FOREIGN PATENT DOCUMENTS

| | | |
|---|---|---|
| CA | 2 506 079 A1 | 5/2004 |
| CN | 1711118 A | 12/2005 |
| CN | 202115048 U | 1/2012 |
| CN | 103201343 A | 7/2013 |
| JP | 1-147209 U | 10/1989 |
| JP | 2006-507416 A | 3/2006 |
| JP | 3157107 U | 1/2010 |
| WO | WO 2004/043544 A1 | 5/2004 |

OTHER PUBLICATIONS

Chinese Office Action, dated Nov. 21, 2018, for Chinese Application No. 201680023732.X, along with an English translation of the Office Action.
International Search Report for PCT/JP2016/063238 (PCT/ISA/210) dated Jul. 12, 2016.
Written Opinion of the International Searching Authority for PCT/JP2016/063238 (PCT/ISA/237) dated Jul. 12, 2016.

*Primary Examiner* — Lynda Salvatore
(74) *Attorney, Agent, or Firm* — Birch, Stewart, Kolasch & Birch LLP

(57) ABSTRACT

An object of the present invention is to provide a waterproof moisture-permeable fabric suppressed in appearance abnormality and deterioration in barrier properties. A waterproof moisture-permeable fabric including a protective layer and a polyethylene microporous film that are stacked on each other with a synthetic rubber-based hot-melt adhesive, an olefinic hot-melt adhesive, or a composite hot-melt adhesive interposed therebetween, having a nonpolar oil content of 2 g/m² or less, and a polar oil content of 0.01 g/m² or more and 6 g/m² or less.

7 Claims, No Drawings

WATERPROOF MOISTURE-PERMEABLE FABRIC AND INFECTION PROTECTIVE GARMENT

TECHNICAL FIELD

The present invention relates to a waterproof moisture-permeable fabric and an infection protective garment made of the waterproof moisture-permeable fabric.

BACKGROUND ART

In recent years, infection protective garments designed for protection from Ebola hemorrhagic fever and super-flu are used from the viewpoint of protecting the body from harmful substances. The infection protective garment generally retains a water-impermeable film layer or coating layer (hereinafter referred to as a barrier layer) in order to secure barrier properties such as viral barrier property, blood barrier property, and hydrostatic pressure. The barrier layer, however, has drawbacks that the layer is poor in air permeability and moisture permeability, gives a strong stuffy feeling when the infection protective garment including the barrier layer is worn, and is poor in clothing comfort due to its poor flexibility, because the barrier layer is thick, moisture-impermeable, and nonporous in order to maintain high barrier properties. For this reason, a microporous film filled with an inorganic filler such as calcium carbonate is used as the barrier layer to reduce the stuffy feeling and improve the clothing comfort (Patent Document 1). A microporous film filled with an inorganic filler, however, has a drawback that it is poor in strengths such as tensile strength and puncture resistance.

Therefore, a polyethylene microporous film containing an ultra-high molecular weight polyethylene as a filler is known (Patent Document 2).

Meanwhile, infection protective garments generally include a laminate of a microporous film and a fiber layer such as a nonwoven fabric that are stacked on each other in order to protect the barrier layer, improve the texture, and reinforce the strength. As a technique to laminate a microporous film and a fiber layer such as a nonwoven fabric on each other, adhesive working using a hot-melt adhesive or the like is employed.

PRIOR ART DOCUMENTS

Patent Documents

Patent Document 1: Published Japanese Translation No. 2005-515912
Patent Document 2: Japanese Patent Laid-open Publication No. 2007-106992

SUMMARY OF THE INVENTION

Problems to be Solved by the Invention

However, when the polyethylene microporous film disclosed in Patent Document 2 is bonded to a nonwoven fabric or the like using, for example, a synthetic rubber-based hot-melt adhesive, the polyethylene microporous film which should be intrinsically white becomes transparent, which may cause appearance abnormality and deterioration in barrier properties.

It is therefore an object of the present invention to provide a waterproof moisture-permeable fabric suppressed in appearance abnormality and deterioration in barrier properties.

Solutions to the Problems

In order to solve the above-mentioned problems, the present invention employs the following means.

(1) A waterproof moisture-permeable fabric including a protective layer and a polyethylene microporous film that are stacked on each other with a synthetic rubber-based hot-melt adhesive, an olefinic hot-melt adhesive, or a composite hot-melt adhesive interposed therebetween,
having a nonpolar oil content of 2 $g/m^2$ or less, and
a polar oil content of 0.01 $g/m^2$ or more and 6 $g/m^2$ or less.

(2) The waterproof moisture-permeable fabric according to (1), wherein the polyethylene microporous film satisfies the following (a) to (d): (a) a water vapor transmission rate of 200 $g/m^2 \cdot h$ or more; (b) a tensile strength of 20 N/5 cm or more; (c) a tensile elongation of 5% or more and 80% or less; and (d) a hydrostatic pressure of 30 kPa or more.

(3) The waterproof moisture-permeable fabric according to (1) or (2), having a viral barrier property that passes a test of JIS T 8061 (2010), Procedure A or Procedure C (Class 3, 3.5 kPa), and a blood barrier property that passes a test of JIS T 8060 (2007), Procedure A or Procedure C.

(4) An infection protective garment including the waterproof moisture-permeable fabric according to any one of (1) to (3).

Effects of the Invention

According to the present invention, it is possible to provide a waterproof moisture-permeable fabric suppressed in appearance abnormality and deterioration in barrier properties.

EMBODIMENTS OF THE INVENTION

<Polyethylene Microporous Film>

The polyethylene microporous film of the present invention is a film having a large number of micropores that penetrate from the surface of the film to the back surface thereof and have air permeability. As a method for forming through holes in the polyethylene microporous film, either a wet method or a dry method may be used as long as the strengths such as puncture resistance and tensile strength, moisture permeability, and barrier properties can be secured. A wet method is preferable because any foreign matters on the film can be washed away with a liquid after film formation.

The wet method is a method for forming voids using a solvent. Specifically, the voids can be formed by the following method. A polyethylene resin as a matrix resin is mixed with a material that is to be extracted after sheet formation, and the mixture is formed into a sheet. From the obtained sheet, only the material to be extracted is extracted using a good solvent for the material before or after biaxial stretching.

The polyethylene that constitutes the polyethylene microporous film may be a homopolymer, or may be a copolymer including a structure derived from another monomer as long as the effect of the present invention is not impaired.

The polyethylene microporous film may contain, for various purposes, various additives such as an antioxidant, a heat stabilizer, a light stabilizer, a neutralizing agent, an antistatic agent, organic particles, inorganic particles, an antiblocking agent, a filler, and an incompatible polymer.

The polyethylene microporous film preferably has a water vapor transmission rate, which is an evaluation criterion of moisture permeability, of 200 g/m²·h or more. On the other hand, the water vapor transmission rate is preferably 2000 g/m²·h or less. When the water vapor transmission rate of the polyethylene microporous film is 200 g/m²·h or more, the polyethylene microporous film is excellent in moisture permeability, and an infection protective garment made of a waterproof moisture-permeable fabric including the polyethylene microporous film is improved in clothing comfort.

From the above-mentioned viewpoint, the moisture permeability rate of the polyethylene microporous film is more preferably 300 g/m²·h or more, even more preferably 350 g/m²·h or more. On the other hand, when the water vapor transmission rate of the polyethylene microporous film is 2000 g/m²·h or less, the film is more excellent in barrier properties. The water vapor transmission rate is evaluated by Method A-1 described in JIS L 1099 (2012). An example of means for setting the water vapor transmission rate of the polyethylene microporous film within the above-mentioned range is to set the content of an ultra-high molecular weight polyethylene having a molecular weight of $1 \times 10^6$ or more to 1 to 15% by mass based on the whole polyethylene.

The polyethylene microporous film preferably has a tensile strength determined according to JIS L 1096 of 20 N/5 cm or more, more preferably 40 N/5 cm or more, even more preferably 60 N/5 cm or more in the machine direction and the cross direction. A polyethylene microporous film having a high tensile strength is preferable due to the following reason: even if a person wearing an infection protective garment made of a waterproof moisture-permeable fabric including such polyethylene microporous film does bending and stretching work and a force is applied to the waterproof moisture-permeable fabric, the polyethylene microporous film is not easily broken. Although the tensile strength of the polyethylene microporous film is not particularly limited, it is preferably 500 N/5 cm or less in order to cut the waterproof moisture-permeable fabric with scissors or the like at the time of sewing to form the waterproof moisture-permeable fabric into an infection protective garment or the like. Herein, the "machine direction" means a direction of roll-out in the manufacture of the polyethylene microporous film. The "cross direction" means a direction orthogonal to the machine direction.

The tensile elongation of the polyethylene microporous film is preferably 3% or more, more preferably 5% or more in the machine direction and the cross direction. On the other hand, the tensile elongation is preferably 80% or less, more preferably 20% or less, even more preferably 15% or less. When the tensile elongation of the microporous film is 80% or less, it is possible to suppress enlargement of the pores of the microporous film even if a person wearing an infection protective garment made of a waterproof moisture-permeable fabric including such polyethylene microporous film works and a force is applied to the waterproof moisture-permeable fabric, and the film undergoes elongation. Thus, viruses and bacteria are prevented from permeating through the microporous film. When the microporous film has a tensile elongation of 3% or more, the microporous film stretches following the movement of the body during working, so that the clothing comfort is improved.

The thickness of the polyethylene microporous film is preferably 10 μm or more, more preferably 15 μm or more, even more preferably 20 μm or more. When the thickness of the polyethylene microporous film is 10 μm or more, excellent puncture resistance and tensile strength can be obtained. In addition, when the polyethylene microporous film is formed into a waterproof moisture-permeable fabric using a hot-melt adhesive, a thicker polyethylene microporous film tends to be more suppressed in transparency. Therefore, the thickness of the polyethylene microporous film is preferably 10 μm or more, more preferably 15 μm or more, even more preferably 20 μm or more also for the above-mentioned reasons. On the other hand, the upper value of the thickness of the polyethylene microporous film is not particularly limited, but it is preferably 50 μm or less. A thinner polyethylene microporous film can be improved in moisture permeability.

The polyethylene microporous film preferably has a hydrostatic pressure of 30 kPa or more, more preferably 40 kPa or more, even more preferably 50 kPa or more as determined according to JIS L 1092, Method A. This value is measured without using a support for suppressing elongation of the polyethylene microporous film.

The blood barrier property of the polyethylene microporous film preferably passes JIS T 8060 (2007), Procedure A or Procedure C.

The viral barrier property of the polyethylene microporous film preferably passes a test of JIS T 8061 (2010), Procedure A or Procedure C (pressure setting: 20 kPa).

The waterproof moisture-permeable fabric of the present invention is desired to have a high blood barrier property and a high viral barrier property. This performance is preferably imparted to the polyethylene microporous film since other layers are not required to have these barrier properties.

The porosity of the polyethylene microporous film is preferably 20% or more, more preferably 30% or more. On the other hand, the porosity is preferably 60% or less, more preferably 50% or less. A porosity of 20% or more can impart moisture permeability, and a porosity of 60% or less can secure the required strength. The porosity is measured by mass analysis.

The pore diameter of the polyethylene microporous film is preferably 35 nm or less, more preferably 30 nm or less, even more preferably 25 nm or less. On the other hand, the pore diameter is preferably 1 nm or more, more preferably 5 nm or more. When the pore diameter of the polyethylene microporous film is 35 μm or less, bacteria and viruses are less likely to penetrate the film, whereas when the pore diameter is 1 nm or more, moisture permeability can be imparted to the polyethylene microporous film. The viral barrier property and the porosity of the polyethylene microporous film pass the above-mentioned tests by setting the pore diameter of the polyethylene microporous film smaller than the virus size (27 nm). The pore diameter is preferably measured by a half dry method.

Moreover, even if pressure is applied to the polyethylene microporous film, and the film undergoes elongation and the pore diameter is enlarged, the pore diameter is preferably smaller than the virus size (the size diameter of bacteriophage defined in JIS T 8061 (2010), that is, 27 nm).

The average pore diameter of the microporous film can be increased, for example, by setting the Mw (weight average molecular weight) of the polyethylene to $1 \times 10^6$ or less. The blood barrier property and the viral barrier property of the polyethylene microporous film can be set to desired levels by adjusting any one of the following conditions at the time of manufacture of the polyethylene microporous film:

casting drum temperature, stretch ratio and stretching temperature in the machine direction of the polyethylene microporous film, and transverse stretching speed and stretch ratio of the polyethylene microporous film, temperature and time in the heat treatment step of the polyethylene microporous film, and relaxation ratio of the polyethylene microporous film in the relaxation zone.

The polyethylene microporous film is low in cost, excellent in productivity, and excellent in barrier properties such as blood barrier property and viral barrier property, and is capable of reducing the stuffy feeling when an infection protective garment made of a waterproof moisture-permeable fabric including the polyethylene microporous film is worn, and improving the clothing comfort of the infection protective garment.

<Protective Layer>

Then, the protective layer will be described. The protective layer used in the waterproof moisture-permeable fabric of the present invention imparts sufficient tensile strength and sufficient abrasion resistance, textures such as proper touch feeling, and softness to the waterproof moisture-permeable fabric. Examples of the form of the material used as the protective layer include fiber structures such as woven fabrics, knitted fabrics, nonwoven fabrics, and paper. A nonwoven fabric is particularly preferable for making the protective layer low in cost, and excellent in tensile strength and abrasion resistance. Examples of the nonwoven fabric include a wet nonwoven fabric, a resin-bonded nonwoven fabric, a thermally bonded nonwoven fabric, a spunbonded nonwoven fabric, a needle punch nonwoven fabric, a water jet punch nonwoven fabric, a meltblown nonwoven fabric, and a flash-spun nonwoven fabric. In addition, a nonwoven fabric manufactured by a papermaking method capable of achieving a uniform basis weight and a uniform thickness can also be preferably used. A spunbonded nonwoven fabric is particularly preferable in terms of cost, tensile strength, and abrasion resistance. Further, a nonwoven fabric which is a combination of a spunbonded nonwoven fabric and a meltblown nonwoven fabric is also suitably used.

Examples of the material of the nonwoven fabric include polyolefins such as polyethylenes and polypropylenes, polyesters such as polyethylene terephthalate and polylactic acid, polycarbonates, polystyrenes, polyphenylene sulfide, fluororesins, and mixtures thereof. Of these, polyolefins, particularly polypropylenes are preferable because of their excellent heat resistance and chemical resistance. Further, a nonwoven fabric made of fibers having a core-sheath structure including a polyethylene as a sheath and a polypropylene as a core contains the same polyethylene as that of the polyethylene microporous film. Since these polyethylenes have melting points close to each other, the adhesion between the nonwoven fabric and the microporous film is improved by ultrasonic sewing. In addition, since a hot-melt adhesive is applied to the nonwoven fabric and the nonwoven fabric is heat-treated, the melting point of the material that constitutes the nonwoven fabric is preferably 130° C. or higher, more preferably 140° C. or higher, even more preferably 150° C. or higher. On the other hand, the melting point of the material is preferably 300° C. or lower.

The tensile strength of the protective layer is preferably 5 N/50 mm or more in order to increase the tensile strength of the waterproof moisture-permeable fabric. The tensile strength is more preferably 10 N/50 mm or more, even more preferably 15 N/50 mm or more. The tensile strength is preferably 300 N/50 mm or less since such a tensile strength secures adequate softness of the waterproof moisture-permeable fabric.

The burst resistance of the protective layer is preferably 300 kPa or more, more preferably 400 kPa or more, even more preferably 500 kPa or more in order to increase the burst resistance of the waterproof moisture-permeable fabric, whereas the burst resistance is preferably 3000 kPa or less. When the burst resistance is 3000 kPa or less, the formed waterproof moisture-permeable fabric is excellent in flexibility and lightweight properties.

The abrasion resistance of the protective layer is preferably grade 3 or higher as described in the section of EXAMPLES in order to increase the abrasion resistance of the waterproof moisture-permeable fabric. The abrasion resistance is more preferably grade 4 or higher.

The thickness of the protective layer is preferably 0.01 mm or more, more preferably 0.1 mm or more. On the other hand, the thickness of the protective layer is preferably 5 mm or less, more preferably 2 mm or less.

The basis weight of the protective layer is preferably 10 $g/m^2$ or more, more preferably 20 $g/m^2$ or more. On the other hand, the basis weight is preferably 200 $g/m^2$ or less, more preferably 100 $g/m^2$ or less.

The protective layer used in the present invention is preferably subjected to treatment for imparting functions to the surface thereof, such as antistatic treatment and water- and oil-repellent treatment. The protective layer is subjected to the antistatic treatment preferably by a method of imparting a conductive polymer to the surface of the protective layer, or a method of imparting a hygroscopic polymer to the surface of the protective layer.

The protective layer after being subjected to the water- and oil-repellent treatment (hereinafter referred to as a water- and oil-repellent protective layer) preferably has a water/alcohol repellency of 5 or more, more preferably 6 or more in terms of the score shown in the section of EXAMPLES, since such a protective layer can prevent an organic liquid contained in an 80% aqueous ethanol solution from coming into contact with the polyethylene microporous film.

As a means for setting the water/alcohol repellency of the water- and oil-repellent protective layer within the above-mentioned range, a method of subjecting the protective layer on a surface layer to water- and oil-repellent treatment can be mentioned. The used water- and oil-repellent treatment agent can be any of existing chemicals such as fluororesins and polyolefin resins. Examples of the fluororesin include PTFE (tetrafluoroethylene resin), PFA (a copolymer of tetrafluoroethylene (TFE) and perfluoroalkoxyethylene), and FEP (a copolymer of perfluoroethylene and perfluoropropene). Meanwhile, examples of the polyolefin resin include polyethylenes and polypropylenes. Further, as another water- and oil-repellent treatment, there is a method of applying a silicone resin to the surface of the protective layer. The water- and oil-repellent treatment is preferably performed by applying a water- and oil-repellent treatment agent to at least the surface of the protective layer.

Further, a dipping method of impregnating the protective layer with a chemical agent is also preferable since water- and oil-repellent performance can be imparted to the whole protective layer. In this case, it is preferable to subject a surface of the protective layer opposite to the surface in contact with the microporous film to the water- and oil-repellent treatment in order to improve the adhesion between various composite hot-melt adhesives and the polyethylene microporous film. This is because the affinity between the surface of the protective layer subjected to the water- and oil-repellent treatment and various hot-melt adhesives is low, and the peel strength of the joint surface between the protective layer and the polyethylene microporous film tends to decrease. A waterproof moisture-permeable fabric obtained by bonding the protective layer and the microporous film together may be subjected to the water- and oil-repellent treatment. The water- and oil-repellent treatment should be performed under such conditions that these hot-melt adhesives would not deteriorate to cause peeling between the protective layer and the polyethylene microporous film.

The hydrostatic pressure of the protective layer is preferably 300 mm $H_2O$ or more, more preferably 400 mm $H_2O$ or more, even more preferably 500 mm $H_2O$ or more in order to prevent a solvent type liquid such as an ethanol antiseptic solution from permeating into the polyethylene microporous film when such liquid comes into contact with the protective layer and pressure is applied to the protective layer. Examples of the means for achieving the hydrostatic pressure include: use of a highly water- and oil-repellent chemical agent for the protective layer, to increase the basis weight of the nonwoven fabric subjected to the water- and oil-repellent treatment, to emboss or calendar the nonwoven fabric subjected to the water- and oil-repellent treatment to increase the density, and to combine a spunbonded nonwoven fabric with a meltblown nonwoven fabric to increase the density.

<Hot-Melt Adhesive>

The hot-melt adhesive used for bonding the protective layer and the polyethylene microporous film together is a synthetic rubber-based hot-melt adhesive, an olefinic hot-melt adhesive, or a composite hot-melt adhesive. These types of adhesives rapidly exhibit the adhesive force in the step of stacking the protective layer and the polyethylene microporous film on each other in the manufacturing process of the waterproof moisture-permeable fabric.

The synthetic rubber-based hot-melt adhesive contains at least a thermoplastic elastomer (hereinafter referred to as a TPE). It is preferable that the synthetic rubber-based hot-melt adhesive also contain a tackifier and/or a mineral oil. The synthetic rubber-based hot-melt adhesive may also contain various additives such as phenolic, phosphorus, and sulfur heat stabilizers and ultraviolet absorbers.

As the TPE, a styrenic TPE is preferably used because it is excellent in processability. The styrenic TPE is composed of a hard segment having a polystyrene structure and a soft segment. Examples of such styrenic TPEs include SBS (polystyrene-polybutadiene-polystyrene), SIS (polystyrene-polyisoprene-polystyrene), SEBS (polystyrene-polyethylene/polybutylene-polystyrene), and SEPS (polystyrene-polyethylene/polypropylene-polystyrene). SBS and SEBS are particularly preferable because a synthetic rubber-based hot-melt adhesive containing SBS or SEBS has excellent adhesive force. SEBS can be synthesized by hydrogenation reaction of SBS.

The olefinic hot-melt adhesive contains a polyolefin which is a thermoplastic resin. It is preferable that the olefinic hot-melt adhesive also contain a tackifier and/or a mineral oil. The polyolefin is preferably a polymer of α-olefin. The olefinic hot-melt adhesive may also contain other substances including the following substances:

various heat stabilizers and ultraviolet absorbers such as phenolic, phosphorus, and sulfur heat stabilizers and ultraviolet absorbers; and a styrenic elastomer for improving the low temperature property and cohesive power of the hot-melt adhesive.

The olefinic hot-melt adhesive is excellent in adhesion to the surface of a sheet, such as a film or fabric made of a nonpolar material such as a polyethylene or a polypropylene. Examples of the polyolefin include polyethylenes, polypropylenes (for example, atactic polypropylene), amorphous poly α-olefin, an ethylene/propylene copolymer, and an ethylene/butene-1 random copolymer. A polyolefin having a relatively small molecular weight is preferable.

The composite hot-melt adhesive contains a TPE and a polyolefin. The composite hot-melt adhesive may also contain a tackifier and/or a mineral oil. The composite hot-melt adhesive may also contain various additives such as phenolic, phosphorus, and sulfur heat stabilizers and ultraviolet absorbers.

As described above, the hot-melt adhesive used in the waterproof moisture-permeable fabric of the present invention preferably contains a tackifier in order to adjust the tack force, adhesive force, holding force, and the like.

Examples of the tackifier include natural resins such as rosin derivatives, and terpene resins such as aromatic modified terpene resins and terpene phenol resins; and petroleum resins such as hydrogenated petroleum resins. Among them, a hydrogenated petroleum resin is preferable in consideration of suppression of decrease in cohesive power of the hot-melt adhesive, improvement in thermal stability, suppression of odor, and satisfactory color tone of the hot-melt adhesive.

The content of the tackifier in the hot-melt adhesive of the present invention is preferably 5% by mass or more based on the whole hot-melt adhesive. On the other hand, the content of the tackifier in the hot-melt adhesive is preferably 60% by mass or less, more preferably 40% by mass or less, even more preferably 20% by mass or less based on the whole hot-melt adhesive. When the content of the tackifier is 5% by mass or more, the hot-melt adhesive is more improved in tackiness and wettability. On the other hand, when the content of the tackifier is 60% by mass or less, the hot-melt adhesive is flexible and improved in adhesive force.

The hot-melt adhesive used in the waterproof moisture-permeable fabric of the present invention can contain a mineral oil as described above in order to adjust the adhesion, flexibility, and the like of the hot-melt adhesive. Examples of the mineral oil include petroleum process oils such as liquid polybutene and liquid paraffin, fully synthetic oils, and semi synthetic oils. The mineral oil is not limited to those manufactured from underground resources.

The content of the mineral oil in the hot-melt adhesive used in the waterproof moisture-permeable fabric of the present invention is preferably 0.01% by mass or more based on the whole hot-melt adhesive. When the content of the mineral oil is 0.01% by mass or more, the melt viscosity of the hot-melt adhesive can be lowered, and the coating workability of the hot-melt adhesive to the adherend is further improved. The content of the mineral oil in the hot-melt adhesive is preferably 20% by mass or less based on the whole hot-melt adhesive. When the content of the mineral oil is 20% by mass or less, bleed-out of the mineral oil from the waterproof moisture-permeable fabric over time can be further suppressed.

<Waterproof Moisture-Permeable Fabric>

The waterproof moisture-permeable fabric of the present invention includes a protective layer and a polyethylene microporous film that are stacked on each other with a hot-melt adhesive interposed therebetween. The waterproof moisture-permeable fabric contains not more than a certain amount of nonpolar oils, and polar oils in an amount within a specific range.

The waterproof moisture-permeable fabric has a nonpolar oil content of 2.0 g/m² or less. Most of the nonpolar oils are derived from the hot-melt adhesive. If the nonpolar oil content in the waterproof moisture-permeable fabric is too high, it is presumed that a large amount of nonpolar oils permeate into the pores and clog most of the aggregate of pores present in the film thickness direction of the polyethylene microporous film, and as a result, the polyethylene microporous film tends to become transparent. In addition, the transparency of the polyethylene microporous film tends to cause appearance abnormality of the waterproof moisture-permeable fabric. Moreover, the transparency of the polyethylene microporous film tends to deteriorate the barrier properties of the waterproof moisture-permeable fabric. From the above-mentioned viewpoint, the nonpolar oil content in the waterproof moisture-permeable fabric is preferably 1.5 g/m² or less, more preferably 1.0 g/m² or less.

The reason why the nonpolar oils permeate into the polyethylene microporous film is unknown, but the reason is presumed to be that the value of the solubility parameter of the nonpolar oils is close to the value of the solubility parameter of the polyethylene microporous film. The solubility parameter is a value that serves as a measure of solubility of two compositions. It can be said that two kinds of compositions having similar solubility parameters tend to be miscible with each other, and conversely, two kinds of compositions having different solubility parameters tend to be immiscible with each other.

The waterproof moisture-permeable fabric has a polar oil content of 0.01 g/m² or more, preferably 0.1 g/m² or more, more preferably 0.5 g/m² or more. The upper value is 6.0 g/m² or less, preferably 5.0 g/m² or less, more preferably 4.0 g/m² or less. The fact that the polar oil content in the waterproof moisture-permeable fabric is not less than a specific amount means that the sum of the amounts of polar oils contained in the members that constitute the waterproof moisture-permeable fabric before being stacked is not less than the specific amount. When the polar oil content in the waterproof moisture-permeable fabric is small, it is impossible to uniformly apply the hot-melt adhesive to the protective layer in the manufacturing process of the waterproof moisture-permeable fabric, and the manufactured waterproof moisture-permeable fabric tends to be unusable for an infection protective garment or the like. That is, productivity of the waterproof moisture-permeable fabric is extremely low. The effect of uniformity of the application can be achieved if the waterproof moisture-permeable fabric has not less than a specific amount of oils irrespective of whether the oils are polar or nonpolar. When the waterproof moisture-permeable fabric contains not less than a specific amount of nonpolar oils, however, as described above, appearance abnormality of the waterproof moisture-permeable fabric tends to occur, and the barrier properties of the waterproof moisture-permeable fabric tend to deteriorate. On the other hand, even if the waterproof moisture-permeable fabric contains a large amount of polar oils, there is almost no appearance abnormality or deterioration in barrier properties of the waterproof moisture-permeable fabric. The reason is unknown, but the reason is presumed to be that the value of the solubility parameter of the polar oils is sufficiently different from the value of the solubility parameter of the polyethylene microporous film. In addition, when the polar oil content in the waterproof moisture-permeable fabric exceeds 6.0 g/m², the waterproof moisture-permeable fabric is very poor in the texture. Although the reason is unknown, when the nonpolar oil content in the waterproof moisture-permeable fabric is high (for example, 1.8 g/m² or more) and the polar oil content in the waterproof moisture-permeable fabric is more than 6.0 g/m², appearance abnormality of the waterproof moisture-permeable fabric tends to occur due to transparency of the polyethylene microporous film. In addition, the transparency of the polyethylene microporous film tends to deteriorate the barrier properties of the waterproof moisture-permeable fabric.

Therefore, when the nonpolar oil content is not more than a specific amount and the polar oil content is within a specific range, the waterproof moisture-permeable fabric of the present invention is suppressed in the occurrence of appearance abnormality and deterioration in barrier properties, and is excellent in productivity and texture.

As a means for setting the nonpolar oil content and the polar oil content in the waterproof moisture-permeable fabric to desired values, the following means can be mentioned. Most of the nonpolar oils and the polar oils contained in the waterproof moisture-permeable fabric are derived from mineral oils and tackifiers contained in the synthetic rubber-based hot-melt adhesive or the olefinic hot-melt adhesive. It is possible to adjust the nonpolar oil content and the polar oil content in the waterproof moisture-permeable fabric to desired values by adjusting the nonpolar oil content and the polar oil content in the synthetic rubber-based hot-melt adhesive or the olefinic hot-melt adhesive.

The nonpolar oils and the polar oils (hereinafter the nonpolar oils and the polar oils are collectively also referred to as oils) contained in the waterproof moisture-permeable fabric are components extractable from the waterproof moisture-permeable fabric using n-hexane.

The nonpolar oils contained in the waterproof moisture-permeable fabric are obtained by passing an extract, which is obtained by n-hexane extraction from the waterproof moisture-permeable fabric, through a Florisil column (the amount of Florisil used is 2.5 g) according to JIS K 0102 (1986), factory effluent test method, 26, "Hydrocarbons and animal and vegetable oils", and removing n-hexane from the eluate having passed through the Florisil column. The Florisil column adsorbs polar oils.

The polar oils contained in the waterproof moisture-permeable fabric are obtained by subtracting the amount of the nonpolar oils from the extract obtained by n-hexane extraction from the waterproof moisture-permeable fabric. The amount of polar oils contained in the waterproof moisture-permeable fabric is preferably 7 g/m² or less, more preferably 6 g/m² or less. When the amount is within this range, deterioration in barrier properties and appearance abnormality of the waterproof moisture-permeable fabric can be further suppressed.

In addition, the rate of the area of the transparent portion in the waterproof moisture-permeable fabric is preferably 2.0% or less, more preferably 1.5% or less, even more preferably 1.0% or less based on the whole waterproof moisture-permeable fabric. This rate can be measured using a square region of 15 cm×15 cm. As described above, setting the rate of the area of the transparent portion in the waterproof moisture-permeable fabric that is produced by permeation of the nonpolar oils to 2.0% or less makes it possible to further suppress the deterioration in barrier properties of the waterproof moisture-permeable fabric.

It is preferable that a water- and oil-repellent protective layer be disposed at the outermost surface of at least one surface of the waterproof moisture-permeable fabric. With this structure, the waterproof moisture-permeable fabric exhibits effective water/alcohol repellency and permeation resistance to water-soluble contaminated water and an ethanol antiseptic solution.

Further, the waterproof moisture-permeable fabric preferably includes, on at least one surface thereof, a water- and oil-repellent protective layer, that is, a nonwoven fabric, which has a hydrostatic pressure of 300 mm $H_2O$ or more and a water/alcohol repellency of 5 or more in terms of the evaluation score shown in the section of EXAMPLES described later. With this structure, the waterproof moisture-permeable fabric can have a permeation resistance to an 80% aqueous ethanol solution (JIS T 8030, Method A) of Class 1 or more in the direction from the water- and oil-repellent protective layer to the polyolefin microporous film. Although details of the mechanism are unknown, it is thought to be as follows: when the 80% aqueous ethanol solution adheres to the surface of the waterproof moisture-permeable fabric on the side of the water- and oil-repellent protective layer, permeation of the 80% aqueous ethanol solution into the water- and oil-repellent protective layer is suppressed due to the water resistance and water/alcohol repellency of the water- and oil-repellent protective layer, and the 80% aqueous ethanol solution easily moves on the surface of the waterproof moisture-permeable fabric on the side of the water- and oil-repellent protective layer, and does not stay at a specific site for a long time.

<Characteristics of Waterproof Moisture-Permeable Fabric>

As for the moisture permeability of the waterproof moisture-permeable fabric of the present invention, the water vapor transmission rate is preferably 200 $g/m^2 \cdot h$ or more, more preferably 250 $g/m^2 \cdot h$, even more preferably 300 $g/m^2 \cdot h$ or more in order to give excellent wearability to an infection protective garment made of the waterproof moisture-permeable fabric. On the other hand, the water vapor transmission rate is preferably 1000 $g/m^2 \cdot h$ or less since it is desired to improve the barrier properties of the waterproof moisture-permeable fabric. The water vapor transmission rate is evaluated by Method A-1 described in JIS L 1099 (2012). The water vapor transmission rate of the waterproof moisture-permeable fabric can be maintained at a high level without impairing the moisture permeability of the polyethylene microporous film, for example, by adjusting the application amount of the hot-melt adhesive.

The tensile strength of the waterproof moisture-permeable fabric of the present invention is preferably 40 N/50 mm or more from the viewpoint of practicality during work of a person wearing an infection protective garment or the like made of the waterproof moisture-permeable fabric. The tensile strength is more preferably 60 N/50 mm or more, even more preferably 80 N/50 mm or more. On the other hand, the tensile strength is preferably 500 N/50 mm or less in order to impart adequate softness to the waterproof moisture-permeable fabric. The tensile strength is evaluated by the method described in JIS L 1096.

The tensile elongation of the waterproof moisture-permeable fabric of the present invention is preferably less than 100%, more preferably less than 80%, even more preferably less than 60% from the viewpoint of clothing comfort, and suppressing the elongation of the polyethylene microporous film and the enlargement of the pore diameter during work of a person wearing an infection protective garment made of the waterproof moisture-permeable fabric. On the other hand, the tensile elongation is preferably 10% or more in order to improve the clothing comfort.

The burst resistance of the waterproof moisture-permeable fabric of the present invention is preferably 400 kPa or more, more preferably 500 kPa or more, even more preferably 600 kPa or more, since breakage of an infection protective garment made of the waterproof moisture-permeable fabric due to external stress can be further suppressed when the infection protective garment is worn. On the other hand, the burst resistance is preferably 2000 kPa or less. When the burst resistance is 2000 kPa or less, the waterproof moisture-permeable fabric is more excellent in flexibility and lightweight properties.

The abrasion resistance of the waterproof moisture-permeable fabric of the present invention is preferably grade 3 or higher in terms of the appearance evaluation when the surface of the waterproof moisture-permeable fabric is abraded, since such abrasion resistance can improve the surface scratch resistance of an infection protective garment made of the waterproof moisture-permeable fabric to external stress when the infection protective garment is worn. The abrasion resistance is more preferably grade 4 or higher.

The hydrostatic pressure of the waterproof moisture-permeable fabric of the present invention is preferably 50 kPa or more, more preferably 70 kPa or more, even more preferably 90 kPa or more, since such hydrostatic pressure can prevent entry of water from the outside when an infection protective garment made of the waterproof moisture-permeable fabric is worn. On the other hand, the hydrostatic pressure is preferably 300 kPa or less. When the hydrostatic pressure is 300 kPa or less, an appropriate number of through holes can be made in the microporous film, and moisture permeability of the waterproof moisture-permeable fabric can be improved. The hydrostatic pressure of the waterproof moisture-permeable fabric can also be adjusted by changing the number of nonwoven fabrics or the like to be further stacked on the waterproof moisture-permeable fabric.

When the blood barrier property of the waterproof moisture-permeable fabric of the present invention passes JIS T 8060 (2007), Procedure A or Procedure C in Class 4, 7 kPa or more, an infection protective garment, a medical garment, or a protective garment made of the waterproof moisture-permeable fabric is more excellent in barrier properties to the blood. It is more preferable that the blood barrier property pass the test of Procedure C in Class 5, 14 kPa or more, and it is even more preferable that the blood barrier property pass the test of Procedure C in Class 6, 20 kPa.

Furthermore, when the viral barrier property of the waterproof moisture-permeable fabric of the present invention passes JIS T 8061 (2010), Procedure A or Procedure C in Class 3, 3.5 kPa or more, an infection protective garment, a medical garment, or a protective garment made of the waterproof moisture-permeable fabric is more excellent in barrier properties to the viruses. It is more preferable that the viral barrier property pass the test of Procedure C in Class 4, 7 kPa or more, it is even more preferable that the viral barrier property pass the test of Procedure C in Class 5, 14 kPa or more, and it is particularly preferable that the viral barrier property pass the test of Procedure C in Class 6, 20 kPa.

As described above, when a person wearing an infection protective garment made of the waterproof moisture-permeable fabric works, the polyethylene microporous film is adequately stretched at the time of bending and stretching. It is preferable that the blood barrier property and the viral barrier property be maintained even when the polyethylene microporous film itself undergoes elongation from the viewpoint of securing the barrier properties of the infection protective garment.

The waterproof moisture-permeable fabric of the present invention preferably has a basis weight of 15 to 250 $g/m^2$. As the basis weight increases, the tensile strength, burst resistance, abrasion resistance, and hydrostatic pressure of the waterproof moisture-permeable fabric are improved. From such a viewpoint, the basis weight of the waterproof moisture-permeable fabric is more preferably 20 g/m² or more, even more preferably 30 g/m² or more. On the other hand, when the waterproof moisture-permeable fabric has a basis weight of 250 g/m² or less, an infection protective garment or the like made of the waterproof moisture-permeable fabric is lighter in weight, and improved in clothing comfort. From such a viewpoint, the basis weight of the waterproof moisture-permeable fabric is more preferably 150 g/m² or less, even more preferably 100 g/m² or less.

Further, the waterproof moisture-permeable fabric of the present invention may have a plurality of protective layers and a plurality of polyethylene microporous films. When the waterproof moisture-permeable fabric has a plurality of protective layers, the protective layers may be the same or different. Further, when the waterproof moisture-permeable fabric has a plurality of polyethylene microporous films, the polyethylene microporous films may be the same or different. The waterproof moisture-permeable fabric of the present invention can have, for example, the following structure.

(i) Protective layer/polyethylene microporous film (ii) Protective layer/polyethylene microporous film/protective layer (iii) Protective layer excellent in abrasion resistance/polyethylene microporous film/protective layer excellent in tensile strength and burst resistance (iv) Protective layer/polyethylene microporous film/polyethylene microporous film/protective layer (v) Polyethylene microporous film/protective layer/polyethylene microporous film/protective layer Among them, a preferable structure is a structure of three or more layers in which a polyethylene microporous film is sandwiched between protective layers, that is, a structure in which a protective layer, a polyethylene microporous film, and a protective layer are arranged in this order as shown in the above (ii) or (iii). In this structure, the polyethylene microporous film is sandwiched between the protective layers, and thus, this structure has an effect of preventing damage of the polyethylene microporous film and loss of the barrier properties.

Further, the two-layer structure of the protective layer and the polyethylene microporous film as in the above (i) is also preferable because such structure improves the moisture permeability and lightweight properties of the waterproof moisture-permeable fabric while securing the desired tensile strength and burst resistance of the waterproof moisture-permeable fabric.

The waterproof moisture-permeable fabric of the present invention preferably has a peel strength at the interface between the protective layer and the polyethylene microporous film that are bonded together of 1.0 N/50 mm or more, more preferably 1.4 N/50 mm or more, even more preferably 1.8 N/50 mm or more. The peel strength can be increased by increasing the application amount of the adhesive. On the other hand, the upper limit of the peel strength is not particularly limited, but is preferably 50 N/5 mm or less, more preferably 30 N/5 mm, since the moisture permeability is lowered when the application amount of the synthetic rubber-based hot-melt adhesive, the olefinic hot-melt adhesive, or the composite hot-melt adhesive is large.

In addition, the peel strength of the waterproof moisture-permeable fabric is preferably 0.8 N/50 mm or more even after the waterproof moisture-permeable fabric is subjected to a warming test at 50° C. (held at 50° C. and a humidity of 30% for 24 hours). The peel strength is more preferably 1.0 N/50 mm or more, even more preferably 1.2 N/50 mm or more. Furthermore, it is more preferable that the peel strength of the waterproof moisture-permeable fabric be 0.8 N/50 mm or more even after the waterproof moisture-permeable fabric is subjected to a warming test at 60° C. (held at 60° C. and a humidity of 30% for 24 hours).

The water/alcohol repellency of the waterproof moisture-permeable fabric is preferably 5 or more, more preferably 6 or more. When the water/alcohol repellency of the waterproof moisture-permeable fabric is 5 or more, the waterproof moisture-permeable fabric has excellent resistance to an ethanol antiseptic solution (80% aqueous ethanol solution). Herein, as a means for setting the water/alcohol repellency of the waterproof moisture-permeable fabric within the above-mentioned range, for example, it is possible to stack the above-mentioned water- and oil-repellent protective layer on the surface layer (the surface to be brought into contact with a liquid).

The permeation resistance of the waterproof moisture-permeable fabric to an 80% aqueous ethanol solution (JIS T 8030 (2005), Method A) is preferably Class 1 or more. The waterproof moisture-permeable fabric of the present invention can have a permeation resistance to an 80% aqueous ethanol solution (JIS T 8030 (2005), Method A) of Class 1 or more by means such as stacking the above-mentioned water- and oil-repellent protective layer on the surface layer of the waterproof moisture-permeable fabric, and stacking the resultant laminate on the above-mentioned polyolefin microporous film. When the waterproof moisture-permeable fabric has a permeation resistance to an 80% aqueous ethanol solution (JIS T 8030 (2005), Method A) of Class 1 or more, the waterproof moisture-permeable fabric is excellent in barrier properties to the 80% aqueous ethanol solution.

The polyethylene microporous film before being used in the waterproof moisture-permeable fabric of the present invention has many pores in the film thickness direction. Due to the presence of pores, large refraction and reflection of light occur between the air and the polyethylene, resulting in whitening of the microporous film.

Herein, it is assumed that the polyethylene microporous film incorporated in the waterproof moisture-permeable fabric is impregnated with a nonpolar oil. Since the microporous film is impregnated with the nonpolar oil, the microporous film naturally has a region in which the pores are filled with the nonpolar oil (hereinafter, this region may be referred to as an oil-filled layer) in the film thickness direction. Since oils have a refraction index closer to polyethylenes than air does, refraction and reflection of light are reduced. A thick oil-filled layer reduces the whiteness of the microporous film, that is, makes the microporous film transparent. A region other than the oil-filled layer in the polyethylene microporous film incorporated in the waterproof moisture-permeable fabric is referred to as a microporous layer. A thicker microporous layer increases the whiteness of the microporous film.

<Method for Manufacturing Waterproof Moisture-Permeable Fabric>

The waterproof moisture-permeable fabric of the present invention is obtained by bonding a protective layer and a polyethylene microporous film together using various hot-melt adhesives. As an example, a bonding method in which a polypropylene spunbonded nonwoven fabric is used as a protective layer will be described below.

The apparatus for bonding the materials using a hot-melt adhesive roughly includes a hot-melt melter, a hose, a nozzle head, and a pattern controller. Known techniques and equipment can be used for such equipment. There are various forms of application of the adhesive, such as curtain spray, spiral spray, slot coating, and ZIP (Z-shaped pattern). Curtain spray and spiral spray are particularly preferable from the viewpoint of moisture permeability, adhesive strength, and softness of the resulting waterproof moisture-permeable fabric. In the hot-melt adhesive treatment, pressure can be applied using calender rolls, triple rolls, embossing rolls or the like after the application of the hot-melt adhesive. However, it is not necessary to purposely apply pressure because oils easily enter the polyethylene microporous film right after the manufacture.

In addition, it is preferable that the hot-melt adhesive be applied to the protective layer. This is because the polyethylene microporous film tends to be shrunk or damaged by heat. In addition, if the protective layer is a fiber structure, application by curtain spray is preferable because the supplied hot air passes through the protective layer, so that the splatter of the hot-melt adhesive is reduced.

Since the waterproof moisture-permeable fabric of the present invention is excellent in barrier properties and moisture permeability, the waterproof moisture-permeable fabric sewn into a coverall, an upper and lower separate clothing, a gown, or the like can be suitably used as a medical garment or a protective garment. A coverall is particularly preferable in order to prevent entry of contaminants and viruses.

EXAMPLES

Hereinafter, the present invention will be described more specifically with reference to examples, but the present invention is not limited to these examples. Various characteristics were measured and evaluated according to the following methods.

(1) Blood Barrier Property

The blood barrier property was measured according to JIS T 8060 (2007). The blood barrier property was measured according to Procedure A and Procedure C described in JIS T 8060 (2007). The sample was evaluated as "passed" when no penetration or wetting was observed in each of Procedures A and C.

(2) Viral Barrier Property

The viral barrier property was measured according to JIS T 8061 (2010). The viral barrier property was measured according to Procedure A and Procedure C (pressure setting: 3.5 kPa (Class 3), 7 kPa (Class 4), 14 kPa (Class 5), and 20 kPa (Class 6)) described in JIS T 8061 (2010). The sample was evaluated as "passed" when no virus was detected in each of Procedures A and C.

(3) Water Vapor Transmission Rate

The water vapor transmission rate was measured according to Method A-1 (calcium chloride method) described in JIS L 1099 (2012). The unit is $g/m^2 \cdot h$.

(4) Puncture Resistance

The puncture resistance was measured at 23° C. according to JIS Z 1707 (1997) except that the needle entry speed was set to 5 mm/min. The load applied to the sample when the sample was broken was read, and the value obtained by dividing the read value by the thickness (mm) of the sample before the test was taken as the puncture resistance (unit: N/mm). The measurement was performed 5 times for each measurement sample, and the average value was used.

(5) Thickness

The thickness of the polyethylene microporous film was evaluated by the following measurement method. The thickness (μm) was measured using a dial gauge type thickness gauge (JIS B 7503 (1997), UPRIGHT DIAL GAUGE (0.001×2 mm) manufactured by PEACOCK, No. 25, measuring element 10 mmφ flat, 50 gf load). The measurement was performed 10 times for each sample, and the average value was used.

The thicknesses of the protective layer and the waterproof moisture-permeable fabric were evaluated by the following measurement method. The thicknesses were measured according to Method A described in 6.1.1 of JIS L 1913 (2010). From a sample, 10 test pieces each having a size of 2500 mm² or more were taken, and a pressure of 0.5 kPa was applied to an upper circular horizontal plate of the thickness gauge to adjust the 0 point. Then, using the thickness gauge, a pressure of 0.5 kPa was applied to the test pieces in a standard state for 10 seconds to measure the thickness up to 0.01 mm. The average of measured values of 10 test pieces was adopted.

(6) Melting Point

Using a differential scanning calorimeter DSC-60 manufactured by Shimadzu Corporation, about 2 mg of a sample was heated to a temperature of 300° C. at a heating rate of 10° C./min in nitrogen, and the maximum melting endothermic peak temperature was taken as the melting point (Tm). The measurement was performed twice for each sample, and the average value was used.

(7) Burst Resistance

The burst resistance was measured according to Method A described in 8.16.1 of JIS L 1096 (1999). First, 5 test pieces each having a size of 15 cm×15 cm were taken. Using a Muellen burst tester, with each test piece facing up, the test piece was held with a clamp while uniform tension was being applied to the test piece so as not to cause wrinkles and sagging, pressure was applied to the test piece, and the strength at which the rubber film pierced and broke the test piece and the strength at break of the rubber film alone were measured. Next, the burst resistances were obtained by the following formula, and the average value was calculated. It was judged that a test piece having a burst resistance of 400 N or more "passed", and a test piece having a burst resistance less than 400 N "failed".

$$B_S = A - B$$

$B_S$: burst resistance (kPa)
A: strength at which rubber film pierced and broke test piece
B: strength at break of rubber film alone (8) Mass Per Unit Area The mass per unit area was measured according to 6.2 of JIS L 1913 (2010). From a sample, 5 test pieces each having a size of 25 cm×25 cm were taken, their weights were measured, and the average value was determined. The average value was multiplied by 16 to obtain the mass per unit area (basis weight) (g/m²).

(9) Tensile Strength and Tensile Elongation

The tensile strength and tensile elongation were measured according to 6.3.1 of JIS L 1913 (2010). Using a constant rate extension type tensile tester, 3 test pieces in each of machine direction and cross direction of the sample, each cut into a width of 50 mm and a length of 300 mm, were subjected to a tensile test under conditions of a grip distance of 200 mm and a tension rate of 100 mm/min. The maximum strength when the sample was pulled until being broken was taken as the tensile strength, and the elongation at that time was taken as the tensile elongation. Average values of the tensile strengths and tensile elongations were calculated in each of the machine direction and the cross direction of the sheet. Of the tensile strengths and tensile elongations in the machine direction and the cross direction, the smaller values were respectively taken as the tensile strength (N/50 mm) and the tensile elongation (%).

(10) Abrasion Resistance

The abrasion resistance was measured according to 6.6.2 of JIS L 1913 (2010). First, 5 circular test pieces each having a diameter of 13 cm were taken, and a hole having a diameter of about 6 mm was made in the center of each test piece. Using a Taber abrasion tester, each test piece was rotated 100 times at about 70 min$^{-1}$ at a load of 2.45 N using an abrasion wheel (CS-10) with the surface of the test piece facing up to give friction to the test piece. The grade of abrasion resistance was judged from the appearance according to the photographs showing boundaries shown in FIG. 14 of JIS L 1913 (2010). It was judged that a test piece having an abrasion resistance of grade 3 or higher "passed", and a test piece having an abrasion resistance lower than grade 3 "failed".

(11) Hydrostatic Pressure

The hydrostatic pressure was measured according to Method B described in 7.1.1 of JIS L 1092 (2009). First, 5 test pieces each having a size of about 150 mm×150 mm were taken from a sample, and attached to the front side of a water resistance test apparatus so that water would be poured on the test pieces. Water was put in a cylinder, a piston handle was turned to give a water pressure rise of 100 kPa per minute, and the water pressure (kPa) when water leaked to 3 sites on the back side of each test piece or when the waterproof moisture-permeable material ruptured was measured. The average value of 5 tests was taken as the hydrostatic pressure.

(12) Peel Strength

The peel strength was measured according to the method described in JIS L 1089 (2007). At an interface between a nonwoven fabric and a polyethylene microporous film bonded together, the nonwoven fabric was peeled off to create a trigger, and a test piece having a width of 50 mm and a length of 300 mm was cut out using a universal testing machine (Autograph AG-IS manufactured by Shimadzu Corporation). Next, for each of 3 test pieces in both the machine direction and the cross direction, a peel test was performed. In the peel test, the test piece was peeled in a T-shape (the nonwoven fabric was pulled in one direction vertical to the surface of the test piece, and the nonwoven fabric was pulled in the other direction vertical to the surface of the test piece) using a constant rate extension type tensile tester under conditions of a grip distance of 50 mm and a tension rate of 150 mm/min. The peel strength was evaluated by sequentially picking up 3 test pieces in descending order from the one exhibiting the highest maximum value of the strength at peeling and 3 test pieces in ascending order from the one exhibiting the lowest maximum value of the strength at peeling, and calculating the average value of 6 test pieces in total.

(13) Warming Test of Waterproof Moisture-Permeable Fabric

Each waterproof moisture-permeable fabric (300 mm×300 mm) was placed in a thermo-hygrostat set at a temperature of 50° C. and a humidity of 30%, kept for 24 hours, and then visually observed. Those that had a transparent portion were judged as "failed", and those that were not transparent were judged as "passed". The transparency means that bleeding from the hot-melt adhesive has some influence.

(14) Area Rate of Transparent Portion

Each waterproof moisture-permeable fabric sample having a size of 15 cm×15 cm was photographed at a magnification of 25 times using VHX 2000 manufactured by Keyence Corporation. The analysis software was set to "automatic area measurement—extraction method (luminance)". For a waterproof moisture-permeable fabric in which even a small transparent portion was produced in the test of item (13), the threshold value was set to −20. For a waterproof moisture-permeable fabric which was not transparent, the threshold value was set to −30. Then, the rate of the area of the transparent portion in the waterproof moisture-permeable fabric sample was calculated. Each of 10 samples was measured in 10 fields of view, and the average value was taken as the area rate of the transparent portion.

(15) Nonpolar Oil Content and Polar Oil Content in Waterproof Moisture-Permeable Fabric The nonpolar oil content and the polar oil content (the nonpolar oils and the polar oils are collectively referred to as oils) in the waterproof moisture-permeable fabric were quantified by the following method. The waterproof moisture-permeable fabric was cut into 100 mm×200 mm. The cut waterproof moisture-permeable fabric was subjected to Soxhlet extraction with n-hexane for 6 hours. The mass of the nonvolatile substance after evaporation of n-hexane at 80±5° C. was taken as the mass of oils.

The evaporation method of n-hexane is as follows. The Soxhlet extract recovered in a pyriform flask was concentrated to 5 to 10 ml with an evaporator at a hot water bath temperature of 80±5° C. Then, the whole contents were transferred to an aluminum plate (manufactured by Teraoka, aluminum cup No. 406), and the contents were completely dried and solidified on a hot plate set at 80° C. Then, the contents were heated in an oven at 80° C. for 30 minutes, and the aluminum plate was placed in a desiccator. The weight of the nonvolatile substance was measured up to the order of 0.1 mg, and the measured value was taken as the amount of oils.

Subsequently, the nonvolatile substance remaining on the aluminum dish was dissolved in about 5 ml of n-hexane, and the resulting solution was passed through a Florisil column (the amount of Florisil used was 2.5 g) according to JIS K 0102 (1986), factory effluent test method, 26, "Hydrocarbons and animal and vegetable oils" (JIS K 0102 (2013) Appendix 1 (Reference) Supplement II) using n-hexane. The mass of the eluate which has passed through the Florisil column and from which n-hexane was removed was taken as the mass of nonpolar oils. In addition, the value obtained by subtracting the mass of nonpolar oils from the above-mentioned mass of oils was taken as the mass of polar oils. The contents of the Florisil column were a product obtained by previously drying Florisil (manufactured by Wako Pure Chemical Industries, Florisil PR for residual agricultural chemical test, particle size: 15 to 250 μm) at 150° C. for 2 hours. The Florisil column was a glass column (inner diameter 10 mm, length 30 cm) filled using n-hexane.

The oil content, nonpolar oil content, and polar oil content per 1 m$^2$ of the waterproof moisture-permeable fabric were calculated according to the following formulae.

Oil content (g/m$^2$)=mass of oils/area of waterproof moisture-permeable fabric(0.02 m$^2$)

Nonpolar oil content (g/m$^2$)=mass of nonpolar oils (g)/area of waterproof moisture-permeable fabric (0.02 m$^2$)

Polar oil content (g/m$^2$)=oil content (g/m$^2$)−nonpolar oil content (g/m$^2$)

In the above-mentioned measurement of the nonpolar oil content and the polar oil content in the waterproof moisture-permeable fabric, a waterproof moisture-permeable fabric cut into a size of 100 mm×200 mm was used according to the manner of bonding, the pattern of bonding, and the like of the nonwoven fabric and the polyethylene microporous film of the waterproof moisture-permeable fabrics of Examples 1 to 5 and Comparative Examples 1 and 2. However, the size of the cut waterproof moisture-permeable fabric is not limited to 100 mm×200 mm. An appropriate size of the cut waterproof moisture-permeable fabric has to be selected according to the manner of bonding, the pattern of bonding, and the like of the nonwoven fabric and the polyethylene microporous film.

(16) Solubility Parameter

The solubility parameter (SP value) is a value obtained from the following formula.

SP value $(\delta) = (\Delta H/V)^{1/2}$ wherein $\Delta H$ is molar evaporation heat (cal), and V is molar volume (cm³).

(17) Wearability

A subject wearing an infection protective garment made of a waterproof moisture-permeable fabric over a shirt and a pair of working pants entered a constant temperature and humidity room simulating the outside air temperature in summer and set at 30° C. and 50% Rh. Near the center of the subject's chest, a thermocouple was attached on top of the shirt, and the temperature inside the protective garment after the subject entered the room was measured with the thermocouple. The measurement was performed on 3 subjects. Data of the 3 subjects were compared with those of "Tyvek software type III" ("Tyvek" is a registered trademark of DuPont-Asahi Flash Spun Products Co., Ltd.) protective garment. Those having a humidity inside the protective garment lower by 10% or more after 30 minutes were evaluated as "good", and those having an average humidity difference less than 10% were evaluated as "defective".

(18) Peel Strength After Warming Test of Waterproof Moisture-Permeable Fabric

A waterproof moisture-permeable fabric (50 mm×300 mm) was placed in a thermo-hygrostat set at a temperature of 50° C. and a humidity of 30%, kept for 24 hours, and then the peel strength after the warming test of the fabric was evaluated by the method described in the item of (12) Peel strength. The peel strength after the warming test of the waterproof moisture-permeable fabric was evaluated in the same manner as described above except that the temperature was changed from 50° C. to 60° C.

(19) Area Rate of Transparent Portion After Warming Test of Waterproof Moisture-Permeable Fabric A waterproof moisture-permeable fabric (15 cm×15 cm) was placed in a thermo-hygrostat set at a temperature of 50° C. and a humidity of 30%, kept for 24 hours, and then the area rate of the transparent portion after the warming test of the fabric was evaluated by the method described in the item of (14) Area rate of transparent portion.

(20) Water/Alcohol Repellency

The water/alcohol repellency was measured according to INDA Standard Test for Water/Alcohol Repellency Test Metthod Method, IST 80. 6-92. A mixed liquid (about 50 μl) of isopropyl alcohol (IPA) and water at a ratio shown in Table 1 was dropped onto a test piece with a dropper to prepare a droplet having a diameter of about 5 mm. Then, 5 droplets were prepared, and allowed to stand for 5 minutes. The shape of the droplets was visually observed. A case where neither entry nor partial absorption of the liquid was observed was evaluated as "passed", and the largest number at which the test liquid did not enter the test piece was taken as the test result. A higher score indicates that the test piece is higher in the repulsion rate.

TABLE 1

| Water repellency score | IPA (volume %) | Water (volume %) |
|---|---|---|
| 0 | 0 | 100 |
| 1 | 10 | 90 |
| 2 | 20 | 80 |
| 3 | 30 | 70 |
| 4 | 40 | 60 |
| 5 | 50 | 50 |
| 6 | 60 | 40 |
| 7 | 70 | 30 |
| 8 | 80 | 20 |
| 9 | 90 | 10 |
| 10 | 100 | 0 |

(21) Permeation Resistance to 80% Aqueous Ethanol Solution

The evaluation was carried out according to JIS T 8030, Method A (2008). The open circuit permeation test apparatus disclosed in FIG. 2 of JIS T 8030, Method A, and the permeation test cell disclosed in FIG. C.1 of JIS T 8030, Method A were used. The permeation resistance was classified according to the breakthrough time based on permeation rate disclosed in Table 5 of JIS T 8115 (2015). It was judged that a sample of Class 1 or more "passed", and a sample less than Class 1 "failed".

(22) Thickness of Polyethylene Microporous Film and Thickness of Microporous Layer Using a scanning electron microscope (SEM), a cross-section of a polyethylene microporous film was photographed under the following conditions. The pretreatment was carried out under cooling conditions so that the film would not melt.

Apparatus: SU 8010 (manufactured by Hitachi High-Technologies Corporation)
Conductive treatment: yes
Pretreatment device: IB-19520CCP manufactured by JEOL Ltd.
Observation voltage: 1.0 kV
Magnification: 1000 times It is possible to observe the thickness of the polyethylene microporous film and the state of entry of the hot-melt adhesive into the micropores of the polyethylene microporous film from the obtained cross-sectional photograph.

SEM cross-sectional photographs of areas around 5 observation points randomly selected in a 40-cm square polyethylene microporous film sample were taken. Then, the 5 cross-sectional photographs of the polyethylene microporous film were analyzed. The section from one end to the other end of the polyethylene microporous film in the obtained cross-sectional photograph was divided into 10 equal parts in a direction vertical to the thickness direction (hereinafter referred to as the length direction), and 10 regions were recognized. The thickness of the polyethylene microporous film at the middle point in the length direction of each region was measured. The average value of the obtained 5×10 thickness values was taken as the thickness of the polyethylene microporous film.

The thickness of the microporous layer of the polyethylene microporous film was measured in the following manner. In each of the 5 samples subjected to the measurement of the thickness of the polyethylene microporous film, 10 regions were observed to recognize the presence of the microporous layer. The thickness of the microporous layer was measured, and the average value of the obtained 5×10 values was taken as the thickness of the microporous layer.

Herein, the thickness of the microporous layer in each region was obtained in the following manner.

i) Of the pores present in the thickness direction of the polyethylene microporous film, the pore arranged closest to one surface side of the polyethylene microporous film is recognized.

ii) A straight line in the thickness direction through the recognized pore is imaged.

iii) A pore that is on the straight line and that is closest to the other surface of the polyethylene microporous film is recognized.

iv) The distance between the pore recognized in i) and the pore recognized in iii) is taken as the thickness of the microporous layer in this region.

(23) Porosity of Polyethylene Microporous Film

The porosity was determined according to the following formula.

Porosity (%)=100×(w2−w1)/w2 wherein w1 is the mass of the microporous film, and w2 is the mass of a nonporous film that is made of the same polyethylene as that of the microporous film and has the same length, width, and thickness as the microporous film does.

<Hot-Melt Adhesive>

(A) Hot-Melt Adhesive A (Composite Hot-Melt Adhesive)

The hot-melt adhesive A contains 8% by mass of a mineral oil (liquid paraffin), 20% by mass of a synthetic rubber (SEBS (polystyrene-polyethylene/polybutylene-polystyrene)), 40% by mass of a tackifier (hydrogenated terpene resin), 20% by mass of a tackifier (petroleum hydrocarbon resin), and 12% by mass of an olefin resin (polybutene). The melt viscosity (Brookfield viscosity) at a temperature of 140° C. is 14000 mPa·s. The softening point is 97° C.

(B) Hot-Melt Adhesive B (Synthetic Rubber-Based Hot-Melt Adhesive)

The hot-melt adhesive B contains 10% by mass of a mineral oil (liquid paraffin), 30% by mass of a synthetic rubber (SBS (polystyrene-polybutadiene-polystyrene)), 35% by mass of a tackifier (hydrogenated terpene resin), and 25% by mass of a tackifier (petroleum hydrocarbon resin). The melt viscosity (Brookfield viscosity) at a temperature of 140° C. is 14000 mPa·s. The softening point is 104° C.

(C) Hot-Melt Adhesive C (Synthetic Rubber-Based Hot-Melt adhesive)

The hot-melt adhesive C contains 20% by mass of a mineral oil (liquid paraffin), 20% by mass of a synthetic rubber (SBS (polystyrene-polybutadiene-polystyrene)), and 60% by mass of a tackifier (petroleum hydrocarbon resin). The melt viscosity (Brookfield viscosity) at a temperature of 140° C. is 4000 mPa·s. The softening point is 82° C.

(D) Hot-Melt Adhesive D (Polyolefinic Hot-Melt Adhesive)

The hot-melt adhesive D contains 5% by mass of a mineral oil (liquid paraffin), 40% by mass of a tackifier (petroleum hydrocarbon resin), 45% by mass of an olefin resin (polybutene), and 10% by mass of an olefin resin (polypropylene). The melt viscosity (Brookfield viscosity) at a temperature of 150° C. is 7000 mPa-s, and the softening point is 122° C.

<Polyethylene Microporous Film>

Polyethylene microporous film A: Thickness: 14 µm. Melting point: 137° C. Pore diameter of micropores: 32 µm. Water vapor transmission rate: 380 g/m²·h. Tensile strength (longitudinal): 40 N/50 mm, tensile strength (transverse): 40 N/50 mm, tensile elongation (longitudinal): 10%, tensile elongation (transverse): 8%. Hydrostatic pressure: 65 kP. Puncture resistance: 370 N/mm. The polyethylene microporous film A has a viral barrier property that passes Procedure A. The polyethylene microporous film A has a blood barrier property that passes Procedure A.

<Protective Layer>

(A) Nonwoven fabric A: Polypropylene spunbonded nonwoven fabric (Basis weight: 40 g/m². Thickness: 0.2 mm. Melting point: 165° C. Tensile strength: 58 N/50 mm. Burst resistance: 500 kPa. Abrasion resistance: grade 4.5)

(B) Nonwoven fabric B: Polypropylene-polyethylene core-sheath spunbonded nonwoven fabric (Basis weight: 30 g/m². Thickness: 0.2 mm. Melting points: 130° C. and 165° C. Tensile strength: 50 N/50 mm. Burst resistance: 450 kPa. Abrasion resistance: grade 4.5).

<Bonding Method>

The method of bonding a protective layer with the polyethylene microporous film using a synthetic rubber-based hot-melt adhesive, an olefinic hot-melt adhesive, or a composite hot-melt adhesive (hereinafter, these are sometimes referred to as hot-melt adhesives) was as follows: a hot-melt adhesive was applied to one surface of a protective layer by curtain spray in an amount of 1 to 5 g/m², and a polyethylene microporous film was bonded to the surface of the protective layer.

<Method for Producing Protective Garment>

Each of waterproof moisture-permeable fabrics produced in examples and comparative examples was cut into the shape of pattern paper. The cut waterproof moisture-permeable fabric was sewn by ultrasonic waves to produce an infection protective garment.

Example 1

The hot-melt adhesive A was applied to one surface of a first nonwoven fabric A by curtain spray under conditions of an application amount of 2.5 g/m², an application temperature of 140° C., and a treatment speed of 30 m/min. The surface of the first nonwoven fabric A to which the hot-melt adhesive A was applied was bonded to the polyethylene microporous film A. Next, the hot-melt adhesive A was applied to one surface of a second nonwoven fabric A under the above-mentioned conditions, and then the surface of the second nonwoven fabric A to which the hot-melt adhesive A was applied was bonded to the surface of the polyethylene microporous film A to which the first nonwoven fabric A was bonded. Then, this material was heat-treated at an air temperature of 160° C., a treatment speed of 30 m/min, and a nip pressure of zero to prepare a waterproof moisture-permeable fabric having a structure of first nonwoven fabric A/polyethylene microporous film A/second nonwoven fabric A. An area of 300 mm×300 mm of the waterproof moisture-permeable fabric was kept in a thermo-hygrostat at 50° C. for 24 hours and taken out. No effect of bleeding was visually observed, and the area rate of the transparent portion was 0.6%. The oil content was 4.1 g/m², the non-polar oil content was 0.6 g/m², and the polar oil content was 3.5 g/m². The viral barrier property of the waterproof moisture-permeable fabric passed Procedure A and Procedure C (pressure setting: 20 kPa). In addition, the blood barrier property passed Procedure A and Procedure C.

In addition, a coverall type infection protective garment was obtained from the waterproof moisture-permeable fabric.

Example 2

The hot-melt adhesive B was applied to one surface of a first nonwoven fabric A by curtain spray under conditions of an application amount of 2.5 g/m², an application temperature of 140° C., and a treatment speed of 30 m/min. The surface of the nonwoven fabric A to which the hot-melt adhesive B was applied was bonded to a surface of the polyethylene microporous film A. Next, under the same conditions, the hot-melt adhesive B was applied to one surface of a second nonwoven fabric A under the above-mentioned conditions, and then the surface of the second nonwoven fabric A to which the hot-melt adhesive B was applied was bonded to the surface of the polyethylene microporous film A to which the first nonwoven fabric A was bonded. Then, this material was heat-treated at an air temperature of 160° C., a treatment speed of 30 m/min, and a nip pressure of 0 N to prepare a waterproof moisture-permeable fabric having a structure of first nonwoven fabric A/polyethylene microporous film A/second nonwoven fabric A.

An area of 300 mm×300 mm of the waterproof moisture-permeable fabric was kept in a thermo-hygrostat at 50° C. for 24 hours and taken out. No effect of bleeding was visually observed, and the area rate of the transparent portion was 0.7%. The oil content was 4.1 g/m$^2$, the non-polar oil content was 0.9 g/m$^2$, and the polar oil content was 3.2 g/m$^2$. The viral barrier property passed Procedure A and Procedure C (pressure setting: 20 kPa). In addition, the blood barrier property passed the standards of Procedure A and Procedure C.

In addition, a coverall type infection protective garment was obtained from the waterproof moisture-permeable fabric.

Example 3

A waterproof moisture-permeable fabric having a structure of first nonwoven fabric B/polyethylene macroporous film A/second nonwoven fabric B was obtained under the same conditions as in Example 2 except that the protective layer was changed from the nonwoven fabric A to the nonwoven fabric B.

An area of 300 mm×300 mm of the waterproof moisture-permeable fabric was kept in a thermo-hygrostat at 50° C. for 24 hours and taken out. No effect of bleeding was visually observed, and the area rate of the transparent portion was 0.5%. The oil content was 4.1 g/m$^2$, the non-polar oil content was 0.9 g/m$^2$, and the polar oil content was 3.2 g/m$^2$. The viral barrier property passed Procedure A and Procedure C (pressure setting: 20 kPa). In addition, the blood barrier property passed Procedure A and Procedure C.

In addition, a coverall type infection protective garment was obtained from the waterproof moisture-permeable fabric.

Example 4

A waterproof moisture-permeable fabric having a structure of first nonwoven fabric A/polyethylene microporous film B/second nonwoven fabric A was obtained under the same conditions as in Example 1 except that the application amount of the adhesive was changed from 2.5 g/m$^2$ to 1.0 g/m$^2$.

An area of 300 mm×300 mm of the waterproof moisture-permeable fabric was kept in a thermo-hygrostat at 50° C. for 24 hours and taken out. No effect of bleeding was visually observed, and the area rate of the transparent portion was 0.3%. The oil content was 1.6 g/m$^2$, the non-polar oil content was 0.2 g/m$^2$, and the polar oil content was 1.4 g/m$^2$. The viral barrier property passed Procedure A and Procedure C (pressure setting: 20 kPa). In addition, the blood barrier property passed Procedure A and Procedure C.

In addition, a coverall type infection protective garment was obtained from the waterproof moisture-permeable fabric.

Example 5

The hot-melt adhesive D was applied to one surface of a first nonwoven fabric A by curtain spray in an application amount of 1.0 g/m$^2$, at an application temperature of 150° C., and at a treatment speed of 30 m/min. The surface of the nonwoven fabric A to which the hot-melt adhesive D was applied was bonded to a surface of the polyethylene microporous film A. Next, the hot-melt adhesive D was applied to one surface of a second nonwoven fabric A under the above-mentioned conditions. The surface of the nonwoven fabric A to which the hot-melt adhesive D was applied was bonded to the surface of the polyethylene microporous film A to which the first nonwoven fabric A was bonded. Then, this material was heat-treated at an air temperature of 160° C., a nip pressure of 0 N, and a treatment speed of 30 m/min to prepare a waterproof moisture-permeable fabric having a structure of first nonwoven fabric A/polyethylene microporous film A/second nonwoven fabric A.

An area of 300 mm×300 mm of the waterproof moisture-permeable fabric was kept in a thermo-hygrostat at 50° C. for 24 hours and taken out. No effect of bleeding was visually observed, and the area rate of the transparent portion was 0.5%. The oil content was 1.7 g/m$^2$, the non-polar oil content was 0.7 g/m$^2$, and the polar oil content was 1.0 g/m$^2$. The viral barrier property passed Procedure A and Procedure C (pressure setting: 20 kPa). In addition, the blood barrier property passed Procedure A and Procedure C.

In addition, a coverall type infection protective garment was obtained from the waterproof moisture-permeable fabric.

Comparative Example 1

A waterproof moisture-permeable fabric having a structure of first nonwoven fabric A/polyethylene microporous film A/second nonwoven fabric A was obtained under the same conditions as in Example 1 except that the hot-melt adhesive A used in Example 1 was changed to the hot-melt adhesive C.

An area of 300 mm×300 mm of the waterproof moisture-permeable fabric was kept in a thermo-hygrostat at 50° C. for 24 hours and taken out. A large number of star-shaped transparent portions were visually observed on the whole fabric, and the area rate of the transparent portions was 4.1%. The oil content was 4.7 g/m$^2$, the nonpolar oil content was 2.2 g/m$^2$, and the polar oil content was 2.5 g/m$^2$. The viral barrier property of the waterproof moisture-permeable fabric failed in Procedure A and Procedure C (pressure setting: 20 kPa). In addition, the blood barrier property passed Procedure A and Procedure C.

In addition, an infection protective garment was obtained from the waterproof moisture-permeable fabric.

Comparative Example 2

A waterproof moisture-permeable fabric having a structure of first nonwoven fabric A/polyethylene microporous film B/second nonwoven fabric A was obtained under the same conditions as in Example 2 except that the application amount of the adhesive was changed from 2.5 g/m$^2$ to 5.0 g/m$^2$.

When an area of 300 mm×300 mm of the waterproof moisture-permeable fabric was kept in a thermo-hygrostat at 50° C. for 24 hours, an effect of star-shaped bleeding was visually observed in the whole fabric, and the area rate of the transparent portions was 3.9%. As a result of measuring the oil content of the waterproof moisture-permeable fabric, the oil content was 8.2 g/m$^2$, the nonpolar oil content was 1.8 g/m$^2$, and the polar oil content was 6.4 g/m$^2$. The viral barrier property of the waterproof moisture-permeable fabric failed in Procedure A and Procedure C (pressure setting: 20 kPa). In addition, the blood barrier property passed Procedure A and Procedure C.

In addition, a coverall type infection protective garment was obtained from the waterproof moisture-permeable fabric. The structure and the like of the waterproof moisture-permeable fabrics are shown in Table 2.

TABLE 2

| Example | Adhesive | Polyethylene microporous film | Protective layer — First protective layer | Protective layer — Second protective layer | Total value of application amounts (*1) g/m² | Application temperature °C. | Viscosity at application mPa·s |
|---|---|---|---|---|---|---|---|
| Example 1 | Hot-melt adhesive A | Polyethylene microporous film A | First nonwoven fabric A | Second nonwoven fabric A | 5.0 | 140 | 14000 |
| Example 2 | Hot-melt adhesive B | Polyethylene microporous film A | First nonwoven fabric A | Second nonwoven fabric A | 5.0 | 140 | 14000 |
| Example 3 | Hot-melt adhesive B | Polyethylene microporous film A | First nonwoven fabric B | Second nonwoven fabric B | 5.0 | 140 | 14000 |
| Example 4 | Hot-melt adhesive A | Polyethylene microporous film A | First nonwoven fabric A | Second nonwoven fabric A | 2.0 | 140 | 14000 |
| Example 5 | Hot-melt adhesive D | Polyethylene microporous film A | First nonwoven fabric A | Second nonwoven fabric A | 2.0 | 150 | 7000 |
| Comparative Example 1 | Hot-melt adhesive C | Polyethylene microporous film A | First nonwoven fabric A | Second nonwoven fabric A | 5.0 | 140 | 4000 |
| Comparative Example 2 | Hot-melt adhesive B | Polyethylene microporous film A | First nonwoven fabric A | Second nonwoven fabric A | 10.0 | 140 | 14000 |

(*1): Total value of application amount of adhesive applied to one surface of first protective layer and application amount of adhesive applied to one surface of second protective layer The evaluation results of the waterproof moisture-permeable fabrics are shown in Tables 3 and 4.

TABLE 3

| | Nonpolar oil content g/m² | Polar oil content g/m² | Oil content g/m² | Application amount g/m² | Residue g/m² |
|---|---|---|---|---|---|
| Example 1 | 0.6 | 3.5 | 4.1 | 5.0 | 0.9 |
| Example 2 | 0.9 | 3.2 | 4.1 | 5.0 | 0.9 |
| Example 3 | 0.9 | 3.2 | 4.1 | 5.0 | 0.9 |
| Example 4 | 0.2 | 1.4 | 1.6 | 2.0 | 0.4 |
| Example 5 | 0.7 | 1.0 | 1.7 | 2.0 | 0.3 |
| Comparative Example 1 | 2.2 | 2.5 | 4.7 | 5.0 | 0.3 |
| Comparative Example 2 | 1.8 | 6.4 | 8.2 | 10.0 | 1.8 |

TABLE 4

| | Viral barrier property | | | | | Blood barrier property | | Hydrostatic pressure kPa | Peel strength N/50 mm | | Area rate of transparent portion % | Moisture permeability g/m²·h | Wearability |
|---|---|---|---|---|---|---|---|---|---|---|---|---|---|
| | Procedure A | Procedure C | | | | Procedure A | Procedure C | | Machine direction | Cross direction | | | |
| | | Class 3 | Class 4 | Class 5 | Class 6 | | | | | | | | |
| Example 1 | Passed | Passed | Passed | Passed | Passed | Passed | Passed | 100 | 2.4 | 1 | 0.4 | 310 | Good |
| Example 2 | Passed | Passed | Passed | Passed | Passed | Passed | Passed | 100 | 2.5 | 1.9 | 0.4 | 300 | Good |
| Example 3 | Passed | Passed | Passed | Passed | Passed | Passed | Passed | 100 | 2.4 | 1.8 | 0.4 | 300 | Good |
| Example 4 | Passed | Passed | Passed | Passed | Passed | Passed | Passed | 100 | 1.6 | 1.6 | 0.1 | 310 | Good |
| Example 5 | Passed | Passed | Passed | Passed | Failed | Passed | Passed | 100 | 1.5 | 1.5 | 0.5 | 310 | Good |
| Comparative Example 1 | Failed | Failed | Failed | Failed | Failed | Passed | Passed | 100 | 2.0 | 2.0 | 2.3 | 300 | Good |
| Comparative Example 2 | Failed | Passed | Passed | Failed | Failed | Passed | Passed | 110 | 5.0 | 4.0 | 2.1 | 290 | Good |

The evaluation results of the waterproof moisture-permeable fabrics after the warming test are shown in Table 5.

TABLE 5

| | After warming test at 50° C. | | | After warming test at 60° C. | | | |
| --- | --- | --- | --- | --- | --- | --- | --- |
| | Peel strength N/50 mm | | Area rate of transparent portion % | Peel strength N/50 mm | | Film thickness A µm | Thickness B of microporous layer µm |
| | Machine direction | Cross direction | | Machine direction | Cross direction | | |
| Example 1 | 2.1 | 1.4 | 0.6 | 1.5 | 1.2 | 14.1 | 8.5 |
| Example 2 | 2.1 | 1.4 | 0.7 | 1.4 | 1.1 | 14.0 | 7.5 |
| Example 3 | 2.0 | 1.5 | 0.5 | 1.6 | 1.3 | 14.1 | 8.5 |
| Example 4 | 1.4 | 1.4 | 0.3 | 1.0 | 0.9 | 14.1 | 13.1 |
| Example 5 | 1.3 | 1.3 | 0.8 | 0.8 | 0.9 | 14.1 | 7.5 |
| Comparative Example 1 | 1.5 | 1.5 | 4.1 | 0.4 | 0.3 | 14.1 | 2.1 |
| Comparative Example 2 | 4.5 | 3.5 | 3.9 | 3.0 | 2.6 | 14.1 | 3.2 |

The waterproof moisture-permeable fabrics of the examples satisfying the requirements of the present invention were suppressed in appearance abnormality and deterioration in barrier properties. In addition, the infection protective garments made of the waterproof moisture-permeable fabrics of the examples were reduced in the stuffy feeling when worn and were excellent in clothing comfort. On the other hand, the waterproof moisture-permeable fabrics of the comparative examples were insufficient in the compatibility among moisture permeability, puncture resistance, and barrier properties.

The invention claimed is:

1. A waterproof moisture-permeable fabric comprising a protective layer and a polyethylene microporous film that are stacked on each other with a synthetic rubber-based hot-melt adhesive, an olefinic hot-melt adhesive, or a composite hot-melt adhesive interposed therebetween,
   having a nonpolar oil content of 2 g/m² or less, and
   a polar oil content of 0.01 g/m² or more and 6 g/m² or less.

2. The waterproof moisture-permeable fabric according to claim 1, wherein the polyethylene microporous film satisfies the following (a) to (d):

(a) a water vapor transmission rate of 200 g/m²·h or more;
   (b) a tensile strength of 20 N/5 cm or more;
   (c) a tensile elongation of 5% or more and 80% or less; and
   (d) a hydrostatic pressure of 30 kPa or more.

3. The waterproof moisture-permeable fabric according to claim 1, having a viral barrier property that passes a test of JIS T 8061 (2010), Procedure A or Procedure C (Class 3, 3.5 kPa), and
   a blood barrier property that passes a test of JIS T 8060 (2007), Procedure A or Procedure C.

4. The waterproof moisture-permeable fabric according to claim 2, having a viral barrier property that passes a test of JIS T 8061 (2010), Procedure A or Procedure C (Class 3, 3.5 kPa), and
   a blood barrier property that passes a test of JIS T 8060 (2007), Procedure A or Procedure C.

5. An infection protective garment comprising the waterproof moisture-permeable fabric according to claim 1.

6. An infection protective garment comprising the waterproof moisture-permeable fabric according to claim 2.

7. An infection protective garment comprising the waterproof moisture-permeable fabric according to claim 2.

\* \* \* \* \*